March 23, 1965   G. W. JOHNSON ETAL   3,174,500
SNAP ACTING ACCUMULATOR CHARGING VALVE
Filed June 29, 1962
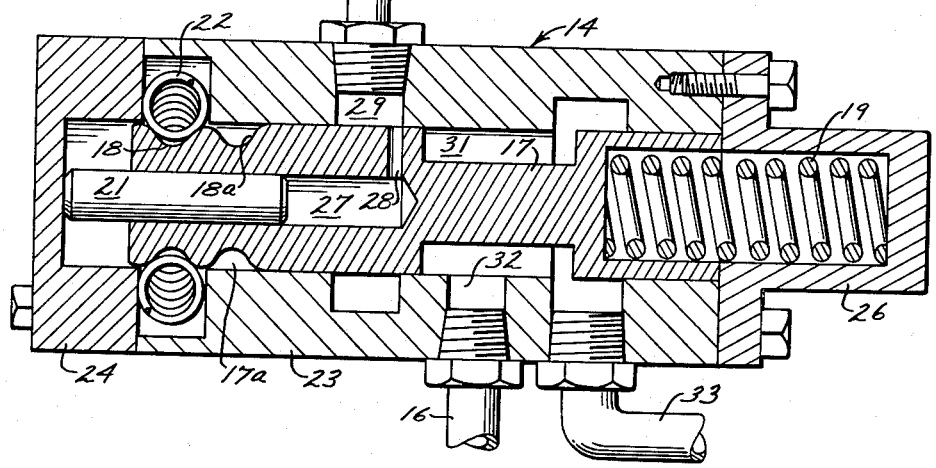
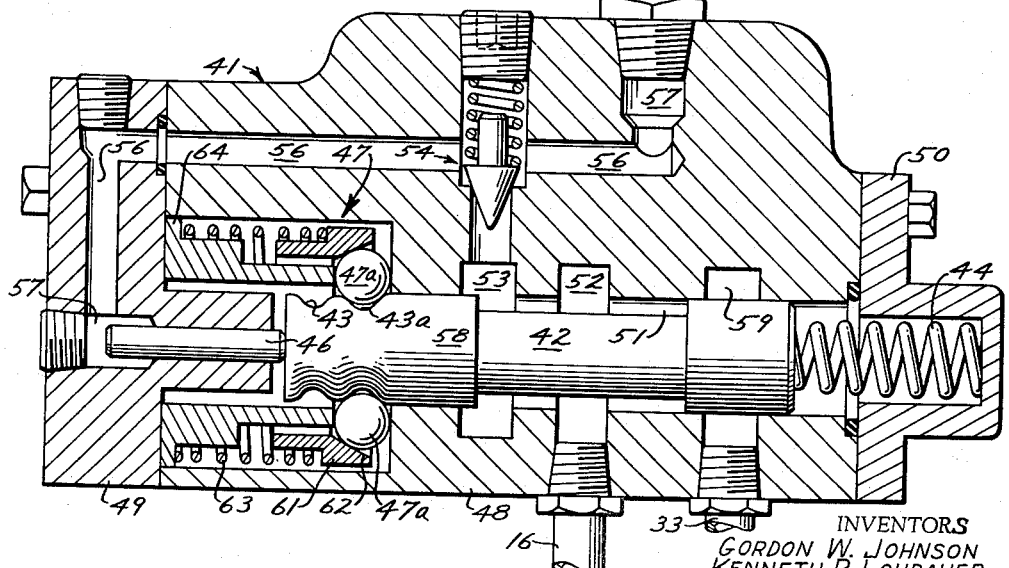
INVENTORS
GORDON W. JOHNSON
KENNETH R. LOHBAUER
DONALD L. SMITH
BY
*Fryer and Zimmold*
ATTORNEYS

United States Patent Office 3,174,500
Patented Mar. 23, 1965

3,174,500
SNAP ACTING ACCUMULATOR CHARGING
VALVE
Gordon W. Johnson, Peoria, Kenneth R. Lohbauer, Joliet, and Donald L. Smith, Peoria, Ill., assignors to Caterpillar Tractor Co., Peoria, Ill., a corporation of California
Filed June 29, 1962, Ser. No. 206,420
5 Claims. (Cl. 137—115)

The present invention relates to hydraulic valves and more particularly to hydraulic charging valves used in conjunction with hydraulic circuit accumulators.

The various hydraulically actuated components and control systems therefor are generally supplied with working fluid from a single source, sufficient to maintain the needed pressure throughout the system. When, however, the hydraulically actuated components and control systems therefor become numerous it is not possible for a single supply to meet the demands of the entire system because of the greater fluid requirements of certain individual control systems and components. To overcome this problem a number of hydraulic accumulators (fluid containers charged with hydraulic fluid) are employed at various locations throughout the system to insure that a fluid pressure is available to the several components, consistent with their needs.

It is, of course, necessary to maintain the pressure within any given accumulator above the minimum pressure necessary to operate the component with which it is associated, and below a maximum pressure which would either cause damage to the accumulator or operate the associated component in an undesirable manner. Thus, it is necessary to furnish with each accumulator a source of charging fluid which is delivered through a charging valve wherein the valve reacts to pressure in the accumulator below the desired minimum by supplying charging fluid to the accumulator and reacts to pressures above the allowable maximum by diverting the charging fluid away from the accumulator.

Due to the requirement that a charging valve open at a set minimum pressure and close at a different pressure (the maximum pressure), charging valves which are known in the art are execptionally complex and costly, and have often been found to be erratic in operation.

Accordingly, it is an object of the present invention to provide a charging valve for a hydraulic circuit accumulator which is simple in construction and dependable in operation.

It is another object of the present invention to provide a valve which opens when a predetermined pressure is realized in an accumulator to which the valve is connected and closes at a higher predetermined pressure in the same accumulator.

Further and more specific objects and advantages of the invention are made apparent in the following specification wherein a preferred form of the invention is described by reference to the accompanying drawing.

In the drawing:

FIG. 1 is a sectional view through the charging valve of the present invention shown in conjunction with a schematically illustrated accumulator; and FIG. 2 is a similar view of an alternate embodiment of the invention also shown in conjunction with a schematically illustrated accumulator.

Referring now to FIG. 1 an accumulator 11 supplies a source of hydraulic pressure through a conduit 12 to a hydraulically actuated component or control system therefor (not shown). A branch line 13 from conduit 12 forms communication between accumulator 11 and a charging valve 14 which is in communication with a pump or other source of charging fluid (not shown) by means of conduit 16. Charging valve 14 comprises a valve spool 17 having a pair of detent grooves 18 and 18a in one of its ends, a pressure control spring 19 acting at the other end of the spool, a reaction plunger 21 and a torus shaped garter spring detent 22; all of which are suitably retained in a housing 23 by a pair of end covers 24 and 26. It is the main function of charging valve 14 to provide communication between conduit 16, from the source of charging fluid, and accumulator 11 when the pressure in the accumulator drops below a minimum value. When the accumulator has been exposed to the charging fluid for a sufficient time to enable the pressure therein to build up to a set maximum value, it is then the function of the valve 14 to discontinue the communication of the accumulator with the source of charging fluid until the pressure in accumulator 11 once again drops below the minimum value.

Valve spool 17 which is slidably disposed in bore 17a of housing 23 is urged to the right (as shown in FIG. 1) by the force of pressure fluid in chamber 27 acting against plunger 21. The pressure of the fluid in chamber 27 is the same as that in accumulator 11 by virtue of communication therewith through port 28 in spool 17, orifice 29 in housing 24 and conduit 13. Urging the piston to the left against the force of the fluid in chamber 27 is pressure control spring 19. In the position in which the components are illustrated in FIG. 1, spool 17 will be moved to the left only when the force of spring 19 is sufficient to overcome the counter-acting forces of the fluid in chamber 27 and detent 22. By proper design, the force of spring 19 will be sufficient to urge spool 17 to the left (so that detent spring 22 resides in detent groove 18a rather than 18) when the pressure in accumulator 11 (and thus in chamber 27) has dropped below the set minimum value. When detent groove 18a aligns with detent spring 22 recess 31 in valve spool 17 communicates with both orifice 32, with which conduit 16 is in communication, and orifice 29 which leads to conduit 13.

The leftward movement of spool 17 does not interrupt the communication between chamber 27 and accumulator 11 so that as accumulator 11 is charged with fluid increasing the pressure therein, the pressure will also increase in chamber 27 and the force urging valve 17 to the right will increase. The force necessary to reposition valve spool 17 to the right is equal to the force necessary to overcome spring 19 plus the force necessary to overcome the retarding force of detent spring 22. Once again by proper design, the pressure at which this necessary force will be realized will be at the desired maximum pressure. When the valve spool 17 is in its rightward (non-communicating) position the charging fluid entering valve 14 from conduit 16 is discharged through conduit 33 to another control circuit or the like (not shown).

The employment of a detent mechanism on the end of valve spool 17 is effective in enabling a relatively simple valve to perform the seemingly complex function of being responsive to open and close at different pressures. It follows that by virtue of its simplicity the valve is both low in cost and highly dependable in operation.

Referring now to FIG. 2 a charging valve 41 (an alternate embodiment of the invention) is disposed between the conduit 16 from a source of charging fluid (not shown) and the accumulator 11 for the purpose of serving the function described in connection with the charging valve of FIG. 1. Charging valve 41 comprises a valve spool 42 having a pair of detent grooves 43 and 43a at one of its ends, a pressure control spring 44 acting at its other end, a piston 46 abutting the end of spool 42 having the detent grooves, and a spring loaded detent 47; all of which are suitably retained in a housing 48 by a pair of end covers 49 and 50. Valve spool 42 is slidably retained in valve bore 51 and resides in one of two longitudinal positions corresponding to the two detent positions. When detent balls 47a reside in detent groove 43a communication exists between an annular recess 52 in valve bore 51 and annular recess 53 in valve bore 51. Recess 53 communicates through a check valve 54 with a passageway 56 leading to orifice 57 which is in direct communication with conduit 13 leading to accumulator 11. Check valve 54 prevents untimely operation of the charging valve which might be caused by leakage past spool 42. Passageway 56 also leads to a piston chamber 57 housing a portion of piston 46 and provides pressure fluid to the piston chamber for the purpose to be described in detail below. Thus, when the components are in the position shown in FIG. 2 communication exists between the source of charging fluid and accumulator 11 enabling the accumulator to be charged with working fluid. As the pressure in accumulator 11 increases so also will the pressure in passageway 56 and chamber 57 thereby increasing the force with which piston 46 acts against valve spool 42. When the force applied by piston 46 against valve spool 42 is sufficient to overcome the opposing forces of spring 44 and detent 47 valve spool 42 will be shifted to the position in which detent balls 47a are aligned in detent groove 43. By proper design the pressure at which this sufficient force is realized is the ultimate maximum accumulator pressure desired.

When spool 42 has been so shifted, communication between recess 52 and 53 is blocked by land 58 on valve spool 42. A third recess 59 in valve bore 51 communicates with conduit 33 leading to a low pressure auxiliary control circuit or the like and communicates with recess 52 when valve spool 42 has been shifted to its rightward position (as shown in FIG. 1). Thus, the charging fluid from conduit 16 is diverted away from accumulator 11 and to another portion of the hydraulic system. In the position in which detent balls 47a are aligned with detent groove 43, spring 44 exerts a force against valve spool 42 urging it to the position in which communication is formed between accumulator 11 and charging conduit 16. The forces of piston 46 and detent 47 act against the force of spring 44, and until the pressure in accumulator 11 drops sufficiently to enable the force of spring 44 to overcome these two forces the charging fluid will be diverted. By proper design the force which piston 46 exerts in opposition to spring 44 is sufficiently low at the minimum desired pressure level of accumulator 11 to enable spring 44 to shift the valve into the charging position, thus enabling the accumulator to be recharged to its maximum value.

Detent mechanism 47 while serving the same general purpose as that of garter spring detent 22 of the embodiment of FIG. 1—namely provide a force which must be overcome in positioning the valve spool in either direction—operates by means of a self-centering collar 61 having an inclined surface 62 which bears against detent balls 47a. The force which the collar exerts on the balls 47a is provided by and dependent upon a spring 63, one end of which seats on collar 61 and the other end of which seats on a sleeve 64. Sleeve 64 surrounds the end of valve spool 42 and prevents longitudinal displacement of the detent balls. The mechanism thus requires that the force acting on balls 47a be sufficient to compress spring 63 the amount necessary to enable the balls to move radially and thereby allow the rise between detent grooves 43 and 43a to pass therebetween. While the detent mechanism of the embodiment of FIG. 1 has the advantage of simplicity the detent mechanism just described has an added advantage of longer wear life.

We claim:
1. In a fluid system having an accumulator, a source of charging fluid therefor and a charging valve, the combination comprising:
a valve housing in fluid communication between the source of charging fluid, the accumulator and a discharge line;
a single valve spool slidably disposed in a valve bore in said housing, said spool having a first position within the bore in which communication between the source of charging fluid and the accumulator is established through the bore and the discharge line is blocked, and a second position in the opposite direction in the bore in which the source of charging fluid is blocked from the accumulator and established to the discharge line;
spring means acting directly on said spool and urging said spool toward the first communicating position with a constant force;
fluid pressure responsive means in communication with said accumulator acting directly on said spool and urging said spool in opposition to said first means and thus toward the position in which the source of charging fluid is blocked from the accumulator; and
third means providing a constant force opposing both of said means.

2. The valve of claim 1 wherein said pressure responsive means comprises;
chamber means in said valve spool;
a reaction plunger slidably disposed in the chamber and against which the fluid pressure in the chamber acts to urge said spool against said first means.

3. The valve of claim 1 wherein said third means comprises a detent on one end of said valve spool.

4. The valve of claim 3 wherein said detent comprises;
a pair of spaced apart detent grooves circumscribing one end of said spool; and
a garter spring surrounding the end of said spool having said detent grooves, wherein said spring is retained in a fixed position and has an inner diameter less than the diameter of said spool so as to resist movement of said spool within the bore.

5. The valve of claim 3 wherein said detent comprises;
a pair of spaced apart detent grooves circumscribing one end of said spool;
a plurality of detent balls disposed about the end of said spool having said detent grooves therein, said balls retained in a fixed longitudinal position; and
spring biased means urging said balls radially inward against said spool.

References Cited in the file of this patent

UNITED STATES PATENTS

| | | |
|---|---|---|
| 2,222,346 | Eickstaedt | Nov. 19, 1940 |
| 2,372,016 | Rockwell | Mar. 20, 1945 |
| 2,661,755 | Slomer | Dec. 8, 1953 |
| 2,693,825 | Carr | Nov. 9, 1954 |
| 2,997,271 | Bounds | Aug. 22, 1961 |
| 3,049,141 | Beatty | Aug. 14, 1962 |

FOREIGN PATENTS

| | | |
|---|---|---|
| 618,867 | Great Britain | Mar. 1, 1949 |